3,216,974
PROCESS FOR THE PREPARATION OF POLYESTER AMIDES FROM OXAZOLIDINONES AND ACID ANHYDRIDES
Jacob van Gijzen, Vlaardingen, Netherlands, assignor to Fabriek Van Chemische Producten Vondelingenplaat N.V., Rotterdam, Netherlands, a corporation of the Netherlands
No Drawing. Filed Dec. 26, 1961, Ser. No. 162,187
Claims priority, application Netherlands, Dec. 28, 1960, 259,504
4 Claims. (Cl. 260—77.5)

The invention relates to a process for the preparation of polyester amides.

It is known that polyester amides may be prepared by the reaction of an alkanol amine with a dibasic acid, in which case the ratio between the number of amide groups and the number of ester groups may be varied by addition of a relatively large or small quantity of a bivalent or a polyvalent alcohol. A condensation of this kind proceeds slowly. If a sufficiently high molecular weight is to be obtained, temperatures exceeding 200° C., as a rule are also necessary. Again, towards the end of the reaction a reduced pressure is required, and it is often necessary to provide for an inert atmosphere in order to prevent degradation of the products (see, for instance, the U.S. patent specifications 2,730,459 and 2,801,226 and K. Thinius et al., Plaste und Kautschuk 6 (1959), 372–5 and 7 (1960), 78).

A variation of this process is the reaction of a diamine and a dicarboxylic acid, to which again bivalent or polyvalent alcohols are added (see, for instance, U.S. patent specification 2,224,037).

Finally in the British patent specification 466,270, for instance, the reaction of a dicarboxylic acid or a dicarboxylic anhydride, bivalent or polyvalent alcohols, and a substituted or a non-substituted ethylene imine is described. However, operation with the dangerous ethylene imine makes this process rather unattractive.

Now it was found that polyester amides can be prepared in a simple way by reacting a cyclic urethan (which may also be referred to as oxazolidinone-2) with anhydrides of dibasic or polybasic acids in the presence of catalysts and at a temperature of 120° to 190° C. The reaction proceeds according to the following reaction equation:

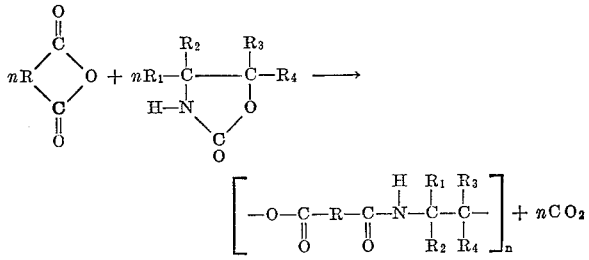

In this equation R means a substituted or a non-substituted alkylene, alkylidene, or arylene radical or hydrogenation products of the later, and $R_1$, $R_2$, $R_3$, $R_4$ represent hydrogen, identical or different alkyl groups containing no more than 4 carbon atoms, or a phenyl radical.

Examples of cyclic urethans to be used for the process according to the invention are oxazolidinone-2, 5-methyloxazolidinone-2, 4-phenyloxazolidinone-2.

Suitable acid anhydrides are, for instance, succinic anhydride, maleic anhydride, phthalic anhydride, tetrahydrophthalic anhydride, and diphenic anhydride.

Obviously, it is also possible to start from mixtures of oxazolidinones and/or acid anhydrides.

To modify the polyester amides, a portion of the oxazolidinone may be replaced by a cyclic ester of carbonic acid or sulphurous acid, such as ethylene carbonate, propylene sulphite, and trimethylene carbonate.

Generally the reaction of an oxazolidinone-2 and an acid anhydride proceeds slowly. By addition of 0.1–5% of a catalyst, calculated on the weight of the mixture, the reaction rate may be greatly increased. Suitable catalysts are not only acid compounds such as sulphuric acid, toluene sulphonic acid, zinc chloride, but also basic substances such as potassium carbonate and trinonyl amine, and also neutral salts. Among the latter category special mention may be made of the halides of the alkali metals, because they have a favourable effect on the colour of the products obtained.

The performance of the reaction is extremely simple. Equivalent quantities of the starting materials are introduced along with the catalyst into a reaction vessel provided with a stirrer. The mixture is heated to the required temperature and the course of the reaction is checked on the basis of the change of the acid value. The reaction period is highly dependent on the components used, the catalyst, and the reaction temperature applied. Generally a reaction period of no more than 10 hours may be said to be effective.

Cross-linked polyester amides may be prepared by starting from anhydrides containing also other groups capable of being reached with the cyclic urethans (such as trimellitic anhydride), or dianhydrides (such as pyromellitic dianhydride). Such a cross-linkage can also be achieved by using, in addition to the cyclic urethan, the commonly employed cross-linking agents, preferably cyclic esters of aliphatic diols and polybasic inorganic volatile acids containing more than one hetero ring (such as pentaerythritol disulphite, glycerol tricarbonate).

The two cross-linking methods may of course be applied simultaneously.

The reaction of an oxazolidinone-2 with an acid anhydride involving ring fissure has not yet been described in the literature.

It is true that in the U.S. patent specification 2,437,390, Example 1, oxazolidinone-2 is treated with boiling acetic anhydride and sodium acetate. In this process 3-acetyloxazolidinone-2 is obtained. Thus, there is no question of ring fissure.

According to J. Idris Jones, "Chemistry and Industry" 1956, 1454–5, ring fissure does occur when oxazolidinone-2 is treated with acids. In the same paper is stated that upon heating of oxazolidinone-2 to 200° C. a rapid decomposition into carbon dioxide and ethylene imine takes place. In the conversion of oxazolidinone-2 with benzoic acid at 250° C. a reaction of the ethylene imine and the acid undoubtedly takes place. Similar reactions are known from the British patent specification 466,270.

In view of this prior art it could not be foreseen that oxazolidinones might be reacted with acid anhydrides at temperatures at which the formation of ethylene imine has not to be considered as substantially impossible.

According to the Swedish patent specification 148,559 oxazolidinone-2 is decomposed at 100°–300° C. into ethylene imine and carbon dioxide.

According to the U.S. patent specification 2,806,839 polyethylene imine is formed when oxazolidinone-2 is heated at reduced or normal pressure. However, it appears from the tests described below that under the conditions under which the preparation of polyester amides according to the invention takes place this decomposition is so small that it will have only a very small influence on the reaction or none at all.

A quantity of 87 g. of oxazolidinone-2 was heated to 160°–165° C. in the presence of 2 g. of potassium fluoride as catalyst. The quantity of $CO_2$ formed in the process is shown in the table below.

| Time in hours | Grams of $CO_2$ | Decomposition in percent |
|---|---|---|
| 2 | 2.17 | 4.7 |
| 5½ | 4.03 | 9.2 |
| 24 | 16.48 | 37.5 |
| 48 | 36.30 | 82.5 |

Since the process according to the invention is always carried out in the presence of a diluent, this decomposition test was repeated with a mixture of 87 g. of oxazolidinone-2, 87 g. of nitrobenzene as diluent, and 2 g. of potassium fluoride as catalyst. Again, upon heating to 160°–165° C. the $CO_2$ evolution was determined.

| Time in hours | Grams of $CO_2$ | Decomposition in percent |
|---|---|---|
| 2 | 0.80 | 1.8 |
| 5½ | 1.85 | 4.2 |
| 24 | 7.33 | 16.7 |
| 48 | 14.84 | 33.7 |

Since the average duration of the process according to the invention is 5½ hours, it follows from the above data that the decomposition of oxazolidinone-2 into ethylene imine and carbon dioxide can play no appreciable role in the present esterification. Moreover, reaction of a non-cyclic urethan with an acid anhydride also takes place, and in that connection it is evident that the formation of a cyclic imine is excluded. Thus isopropyl-N-phenyl carbamate, for instance, could be reacted quantitatively with acetic anhydride at 140°–150° C. into acetanilide and isopropyl acetate.

*Example I*

Into a flask provided with a stirrer and a thermometer are introduced 44 g. of oxazolidinone-2 (0.5 mol), 50 g. of succinic anhydride (0.5 mol), and a catalyst consisting of 2.5 g. of potassium fluoride 2 aq. and 1 g. of lithium bromide.

With stirring, the mixture is heated to 180° C., at which a spontaneous $CO_2$ evolution occurs. The course of the conversion is checked by determining the acid value from time to time. After 1½ hours this is 93, after 2½ hours 27, after 3 hours 13.5, after 3½ hours 3.7, after 4 hours 2.3, and after 4½ hours 1.4. The reaction product with acid value 1.4 is a highly viscous polyester amide with a faintly yellow colour. Upon cooling to room temperature, the polycondensate solidifies and forms a practically white crystalline product. It has a melting range and at 90° C. has melted to a clear liquid again.

*Example II*

In a similar way to Example I a polycondensation is carried out with 54.4 g. of oxazolidinone-2 (0.625 mol) and 92.5 g. of phthalic anhydride (0.625 mol) and 3 g. of potassium chloride.

The reaction temperature is 180°–185° C. After 8 hours a loss of weight of 26 g. has occurred; the acid value is 7.8. Upon cooling to room temperature, a faintly yellow, highly viscous resin is obtained, which slowly crystallizes to a substantially white crystalline mass. This substance has a softening point of about 75° C. at 137° C. it has melted completely.

*Example III*

A polyester amide, in which the ratio of the ester and amide groups is about 20:1, is prepared from 100 g. of ethylene carbonate (1.136 mols), 10 g. of oxazolidinone-2 (0.115 mol), 185 g. of phthalic anhydride (1.25 mols), and 5 g. of a catalyst consisting of a mixture (8:1) of lithium chloride and potassium chloride.

After 3½ hours heating to 185° C., substantially the calculated quantity of $CO_2$ has escaped and a faintly yellow polyester amide is obtained, which upon cooling to room temperature solidifies. This product has an acid value of 12.1; the softening point is 45° C. and the melting range 61°–62° C.

*Example IV*

In an open reaction vessel 55 g. of oxazolidinone-2 (0.625 mol), 55 g. of glycol carbonate (0.625 mol), 125 g. of succinic anhydride (1.25 mols), and 10 g. of a 50% solution of lithium bromide in water are heated with stirring. The reaction starts at about 140° C. The water of the catalyst is expelled by the $CO_2$ evolution. The temperature is raised in about 1 hour to 190° C. The polyester amide thus obtained is a viscous liquid of straw-yellow colour, with acid value 25.

*Example V*

From 146 g. of phthalic anhydride, 22.5 g. of pentaerythritol disulphite, 70 g. of oxazolidinone-2, and 5 g. of lithium bromide a light-yellow polyester amide is prepared in a similar way. The reaction temperature is 175° C., while the reaction period is 4½ hours. The acid value of the polyester amide is 10.1.

*Example VI*

In a similar way a light-yellow polyester amide is prepared from 100 g. of 5-methyloxazolidinone-2, 146.5 g. of phthalic anhydride, and 5 g. of lithium bromide. The conversion temperature was 190° C., the reaction period 6½ hours, while the acid value is 38.

What I claim is:

1. The process for preparing a polyester amide which comprises reacting one mole of an anhydride selected from the group consisting of organic dibasic acid anhydrides, trimellitic acid anhydride and pyromellitic acid dianhydride with substantially one mole of a cyclic urethane selected from the group consisting of oxazolidinone-2, 5-methyloxazolidinone-2, and 4-phenyloxazolidinone-2 in the presence of a polyester amide-forming catalyst at a temperature of 120° to 190° C.

2. The process of claim 1 wherein said catalyst is an alkali metal halide.

3. The process of claim 1 wherein said reaction is carried out in the presence of a cross-linking agent which is a cyclic ester of an aliphatic diol and a polybasic inorganic volatile acid containing more than 1 hetero ring.

4. The process of claim 3 wherein said cross-linking agent is pentaerythritol disulphite.

References Cited by the Examiner

UNITED STATES PATENTS

| 2,224,037 | 12/40 | Brubaker et al. | 260—78 XR |
| 2,437,390 | 3/48 | Homeyer | 260—77.5 |
| 3,044,992 | 7/62 | Hibbard et al. | 260—77.5 |

FOREIGN PATENTS 882,706   7/53   Germany.

LEON J. BERCOVITZ, *Primary Examiner.*

NORMAN G. TORCHIN, *Examiner.*